United States Patent
Zeng et al.

(10) Patent No.: US 10,461,851 B1
(45) Date of Patent: Oct. 29, 2019

(54) PREDICTING OPTICAL TRANSCEIVER FAILURE

(71) Applicant: Facebook, Inc., Menlo Park, CA (US)

(72) Inventors: WenSheng Zeng, Fremont, CA (US); Abhijit Chakravarty, Fremont, CA (US); Hans-Juergen Schmidtke, Mountain View, CA (US); Edward Galley, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/941,462

(22) Filed: Mar. 30, 2018

(51) Int. Cl.
*H04B 10/079* (2013.01)
*H04B 10/50* (2013.01)
*H04B 10/40* (2013.01)

(52) U.S. Cl.
CPC ... *H04B 10/0791* (2013.01); *H04B 10/07955* (2013.01); *H04B 10/40* (2013.01); *H04B 10/503* (2013.01)

(58) Field of Classification Search
CPC .......... H04B 10/07955; H04B 10/0775; H04B 10/0793
USPC ....................................... 398/37, 9
See application file for complete search history.

(56) References Cited

U.S. PATENT DOCUMENTS

| | | | |
|---|---|---|---|
| 5,265,110 A | 11/1993 | Naya | |
| 5,673,282 A * | 9/1997 | Wurst | H01S 3/13 372/38.07 |
| 6,317,231 B1 * | 11/2001 | Al-Salameh | H04B 10/077 398/14 |
| 6,524,016 B1 | 2/2003 | Ohki | |
| 6,618,811 B1 * | 9/2003 | Berthaud | G06F 1/26 713/300 |
| 2004/0164935 A1 * | 8/2004 | Dedene | H01L 27/3218 345/75.2 |
| 2004/0196354 A1 * | 10/2004 | Hansen | H01S 3/113 347/224 |
| 2005/0007908 A1 | 1/2005 | Yonemitsu | |
| 2006/0036515 A1 | 2/2006 | Ingalsbe | |
| 2006/0062116 A1 | 3/2006 | Ishibashi | |
| 2007/0195847 A1 * | 8/2007 | Fukamachi | B82Y 20/00 372/46.01 |
| 2008/0165635 A1 * | 7/2008 | Bakx | G11B 7/126 369/47.5 |
| 2009/0192735 A1 * | 7/2009 | Horiuchi | H01S 5/0021 702/58 |
| 2011/0019183 A1 | 1/2011 | Ukon | |
| 2013/0051425 A1 * | 2/2013 | Huang | G01K 1/022 374/141 |
| 2013/0121683 A1 * | 5/2013 | Nagamine | H04L 41/0677 398/2 |
| 2013/0223472 A1 | 8/2013 | Maston | |
| 2014/0281479 A1 * | 9/2014 | Gettings | G01N 33/0062 713/150 |
| 2015/0022181 A1 | 1/2015 | Anderson | |

(Continued)

*Primary Examiner* — Oommen Jacob
(74) *Attorney, Agent, or Firm* — Van Pelt, Yi & James LLP (57) ABSTRACT

The amount of current provided to a laser diode of an optical network transceiver device is monitored, the amount of current reaching a threshold limit is detected, and the power output of the optical network transceiver device is monitored. Based at least in part on the detection that the amount of current has reached the threshold limit and the monitored power output of the optical network transceiver device, a likelihood of failure of the optical network transceiver device is predicted.

20 Claims, 6 Drawing Sheets

(56) References Cited

U.S. PATENT DOCUMENTS

| | | |
|---|---|---|
| 2015/0092801 A1 | 4/2015 | Bjarlin |
| 2015/0379853 A1 | 12/2015 | Gallo |
| 2016/0253415 A1* | 9/2016 | Zhong ................ G06F 11/0721 707/722 |
| 2017/0109589 A1* | 4/2017 | Van Gorp .......... G06K 9/00771 |
| 2017/0279246 A1* | 9/2017 | Muendel ............. B23K 26/703 |

* cited by examiner

PREDICTING OPTICAL TRANSCEIVER FAILURE

BACKGROUND OF THE INVENTION

Large datacenters typically utilize numerous high-speed optical transceivers in a network environment. In the event of a network fault, such as a downed link, the network is analyzed and the source of the fault is identified. Typically, the source is identified by systematically eliminating different potential causes. In some cases, the fault is due to a failed optical network transceiver device. However, definitively determining that a faulty optical transceiver is the source of the problem can be laborious and time consuming. Moreover, while troubleshooting is being performed, the network functionality is compromised due to the downed network link. Therefore, there exists a need to reduce the network downtime by predicting when an optical network transceiver device will fail. Those devices predicted to fail in the near term are monitored more closely and/or proactively replaced.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Predicting the failure of an optical network transceiver device is disclosed. For example, by monitoring the operation of optical network transceiver devices, a soon-to-fail device can be identified and proactively replaced. By preemptively replacing a working but soon-to-fail optical network transceiver device, the network downtime is reduced significantly compared to allowing the device to fail and performing the troubleshooting necessary to identify the device as the cause of the network fault. In various embodiments, the operating current and power output of an optical transceiver is monitored. For example, the device is monitored to detect for the operating current of the laser diode reaching a threshold limit such as the saturation current limit. The power output of the optical network transceiver device is also monitored. In the event the power output stabilizes and operates near the beginning-of-life (BOL) power output level, a prediction is made that the device does not have a high likelihood of failing soon. However, in the event the power output continues to drops while the current operates near the threshold limit, for example, the power output approaches the lower operating specification of the optical network transceiver device, a prediction is made that the device has a high likelihood of failing soon. In various embodiments, the predicted failure is identified and an alarm is triggered to display in a monitoring dashboard of a monitor device, such as a network server for monitoring network health. Based on the alarm, the soon-to-fail optical network transceiver device is identified and can be proactively replaced.

In various embodiments, an optical network transceiver device is monitored. For example, each optical network transceiver device includes a laser diode that operates at a particular current. The amount of current provided to the laser diode of the device by a laser driver is monitored. When transmitting an optical signal, the operating current may fluctuate over time. In various embodiments, the amount of current reaching a threshold limit is detected. For example, an optical network transceiver device reaching a saturation current threshold level is detected. In various embodiments, the power output of the optical network transceiver device is monitored. For example, an optical transceiver transmits a signal with a particular power output. The power output can be measured using power monitoring hardware of the optical network transceiver device such a tap monitor powering module. In various embodiments, based at least in part on the detection that the amount of current has reached the threshold limit and the monitored power output of the optical network transceiver device, a likelihood of failure of the optical network transceiver device is predicted. For example, in the event the current of an optical network transceiver device reaches a threshold limit, such as a current saturation limit, and the monitored power output continues to drop towards the end-of-life (EOL) power output level, a prediction can be made that the device has a high likelihood of failing within a short timeframe. For example, the lifespan of the optical network transceiver device may be only one to three weeks once a high likelihood of failure is predicted. In various embodiments, based on the prediction, the device can be replaced and/or more closely monitored. Replacement of the optical network transceiver device prior to failure avoids the lengthy downtime that will be incurred if not replaced and allowed to continue operating in the network environment until failure.

Figure 1:
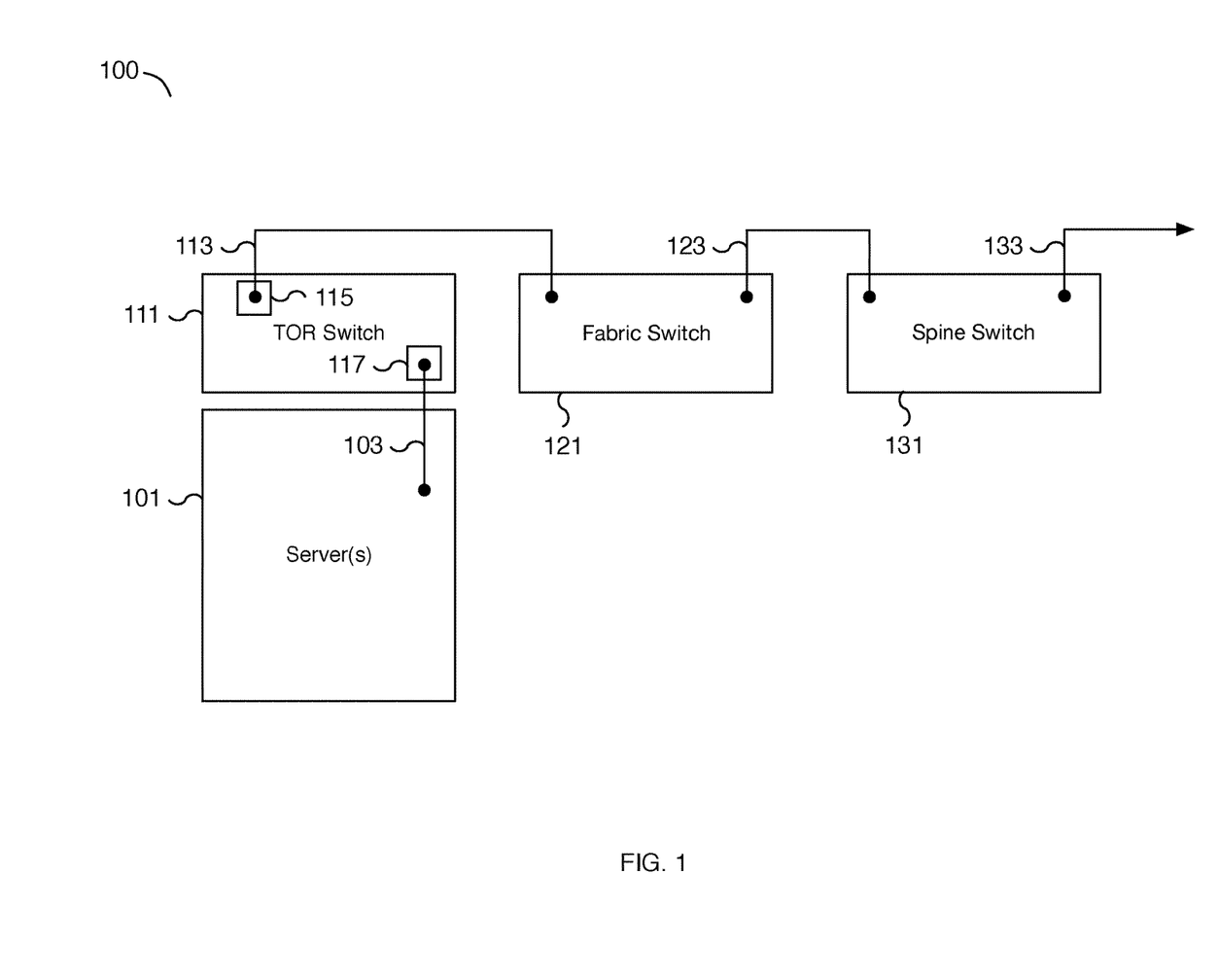
FIG. 1 is a block diagram illustrating an example of a network environment for predicting the failure of an optical network transceiver device.

FIG. 1 is a block diagram illustrating an example of a network environment for predicting the failure of an optical network transceiver device. In the example shown, network environment 100 includes server rack 101, top of the rack (TOR) switch 111, fabric switch 121, and spine switch 131. TOR switch 111, fabric switch 121, and spine switch 131 are communicatively connected via optical network connections 113 and 123, respectively, as shown. Spine switch 131 is communicatively connected to another network equipment (not shown) via optical network connections 133. Server rack 101 includes one or more servers and is communicatively connected to TOR switch 111 via network connections 103. For example, in some embodiments, server rack includes multiple servers for providing network applications such as an online social networking application. Servers of server rack 101 are connected to TOR switch 111 via network connections 103. In some embodiments, server rack 101 includes TOR switch 111 mounted in the same rack and above one or more servers. In various embodiments, network connections 103 are direct attach copper (DAC) cable connections between servers of server rack 101 and TOR switch 111. In some embodiments, network connections 103 are one or more network connections between servers of server rack 101 and TOR switch 111 using DAC cables or other appropriate connections. In various embodiments, one or more optical network transceiver devices (not shown) are utilized for optical network connections 113, 123, and 133. In various embodiments, the optical network transceiver devices of optical network connections 113, 123, and 133 are configured to perform the processes described with respect to FIGS. 5 and 6 to predict a likelihood of failure.

In the example shown, TOR switch 111 includes optical network interfaces 115 and server network interfaces 117. In various embodiments, server network interfaces 117 include one or more network interfaces to connected to server rack 101 via network connections 103. In some embodiments, server network interfaces 117 utilize direct attach copper (DAC) cable connections. In the example shown, optical network interfaces 115 of TOR switch 111 are utilized to connect to fabric switch 121 via optical network connections 113. In various embodiments, TOR switch 111 utilizes multiple network interfaces including both optical and non-optical network interfaces. In various embodiments, optical network interfaces 115 of TOR switch 111 utilize one or more optical transceiver network devices (not shown) and optical network connections 113 include one or more 100-gigabit optical network connections compatible with the CWDM4 Lite standard. In some embodiments, optical network connections 113 are fiber cables with a maximum length of 500 meters. In some embodiments, optical network connections 113 support a length up to 2 kilometers. In various embodiments, TOR switch 111 includes multiple network interfaces including 32 total ports with four optical links and 28 non-optical links. For example, in one embodiment, TOR switch 111 includes four ports each utilizing an optical network transceiver device and is connected to four ports of fabric switch 121. The 28 non-optical links are connected to up to 28 servers of server rack 101 via DAC connections. In some embodiments, in the event one of the four optical links of optical network connections 113 fails, the remaining three connections are able to route around the failed link. Although able to route around the failure, the failure results in increased power consumption, additional troubleshooting, reduced throughput, and a delay in re-routing the connection, among other issues.

In various embodiments, fabric switch 121 includes multiple optical network interfaces (not shown). For example, in one embodiment, fabric switch 121 is a 128-port optical interconnect switch. In the example shown, fabric switch 121 is connected to spine switch 131 via optical network connections 123. In some embodiments, spine switch 131 is a 128-port optical interconnect switch. In various embodiments, spine switch 131 is connected to additional networking equipment, such as one or more additional optical switches, via optical network connections 133. In various embodiments, with the exception of optical network connections 133, components of FIG. 1, e.g., server rack 101, TOR switch 111, fabric switch 121, and spine switch 131, all reside in the same network data center and optical network connections 133 are network connections that terminate at a different data center.

In various embodiments, the components shown in FIG. 1 may exist in various combinations. Although single instances of components have been shown to simplify the diagram, additional instances of any of the components shown in FIG. 1 may exist for a network environment. For example, one or more additional switches, routers, network connections, fiber and/or Ethernet connections, etc. may exist for providing network functionality. For example, in some embodiments, network environment 100 includes one or more additional switches and/or routers for establishing a network connection to another data center. Components not shown in FIG. 1 may also exist.

Figure 2:
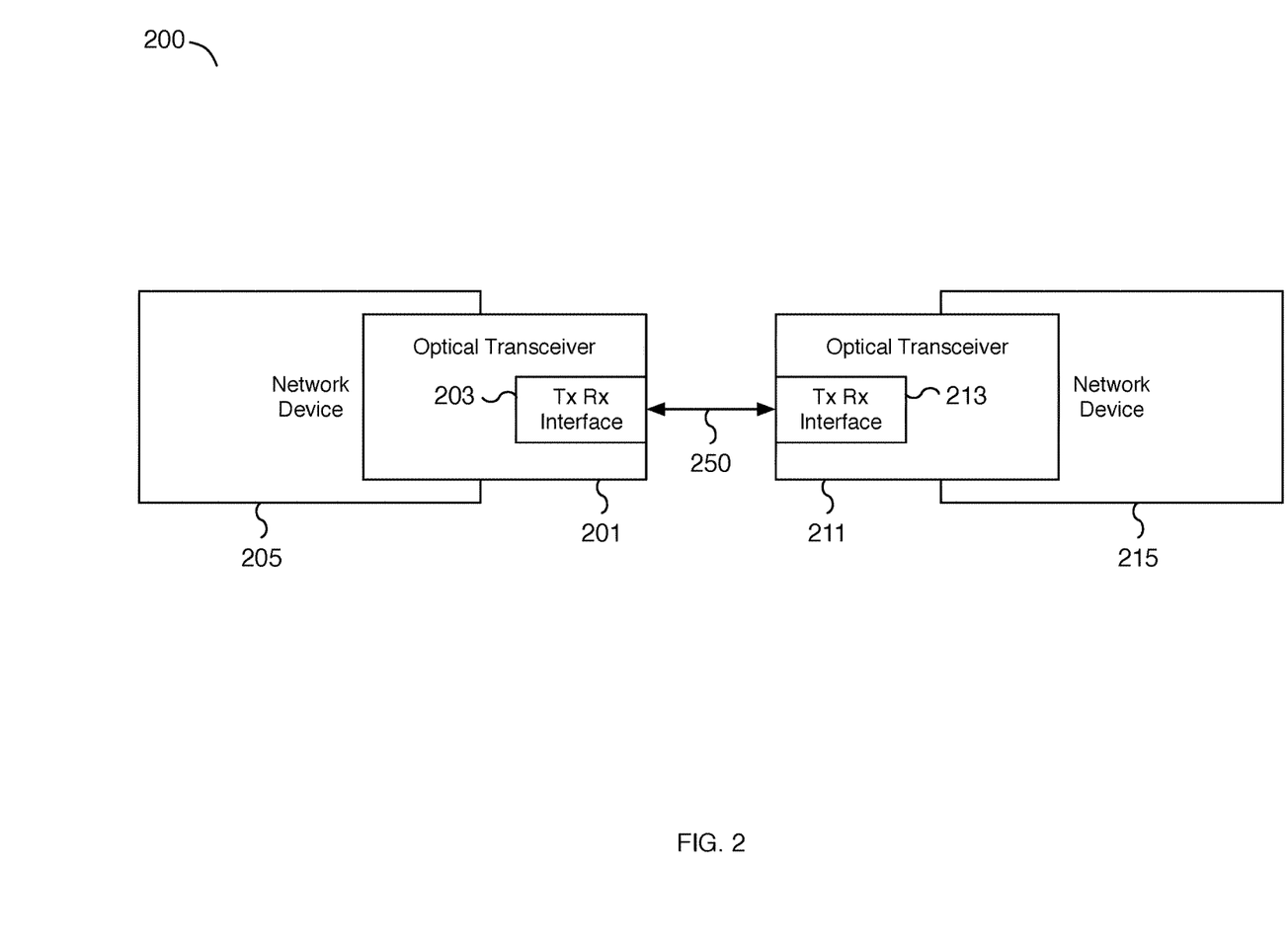
FIG. 2 is a block diagram illustrating an example of a network environment for predicting the failure of an optical network transceiver device.

FIG. 2 is a block diagram illustrating an example of a network environment for predicting the failure of an optical network transceiver device. In the example shown, network environment 200 includes two optical network transceiver devices 201 and 211 that are connected via optical network connection 250. In some embodiments, optical network connection 250 is a single-mode fiber cable. Each of optical network transceiver devices 201 and 211 includes an optical Tx Rx interface for transmitting and receiving optical signals. Optical network transceiver device 201 includes optical Tx Rx interface 203 and optical network transceiver device 211 includes optical Tx Rx interface 213. Optical network transceiver devices 201 and 211 utilize optical Tx Rx interface 203 and optical Tx Rx interface 213 to establish optical network connection 250.

In the example shown, optical network transceiver device 201 is inserted into network device 205 and optical network transceiver device 211 is inserted into network device 215. In various embodiments, network devices 205 and 215 are network switches. In some embodiments, network devices 205 and 215 are TOR switch 111, fabric switch 121, and/or spine switch 131 of FIG. 1. In some embodiments, optical network connection 250 is optical network connection 113, 123, and/or 133 of FIG. 1.

In some embodiments, optical network transceiver devices 201 and 211 utilize a Quad Small Form-factor Pluggable (QSFP) interface. In some embodiments, the interface is a QSFP+, QSFP28, or other variation of a QSFP interface. In various embodiments, optical network transceiver devices 201 and 211 are optical transceivers utilizing a QSFP, QSFP+, QSFP28, or appropriate interface. For example, optical network transceiver devices 201 and 211 may be high-speed quad-channel optical transceiver devices wherein each channel supports one or more transmitting rates. In various embodiments, the transmitting rates may range from 1 gigabit/second up to 28 gigabits/second. In some embodiments, the interface is compatible with transmitting rates reaching a rate of 100 gigabits/second per channel and/or up to 400 gigabits/second total for four channels. In various embodiments, optical Tx Rx interfaces 203 and 213 are configured to work with multiple transmitting rates including 28 gigabits/second and up to 100 gigabits/second per channel.

As described in further detail below, optical network transceiver devices 201 and 211 transmit and receive optical signals. In various embodiments, to maintain the power output of an optical signal travelling over optical network connection 250, a current of optical network transceiver devices 201 and 211 is adjusted based on feedback from monitoring the transmitting power output. For example, in response to the power output of an optical network transceiver device dropping, the amount of current for the device is increased to stabilize the power output. In various embodiments, the optical network transceiver device monitors the power output in order to adjust the current. For example, in some embodiments, an optical network transceiver device includes a tap monitor powering module to monitoring transmitting power output.

Figure 3:
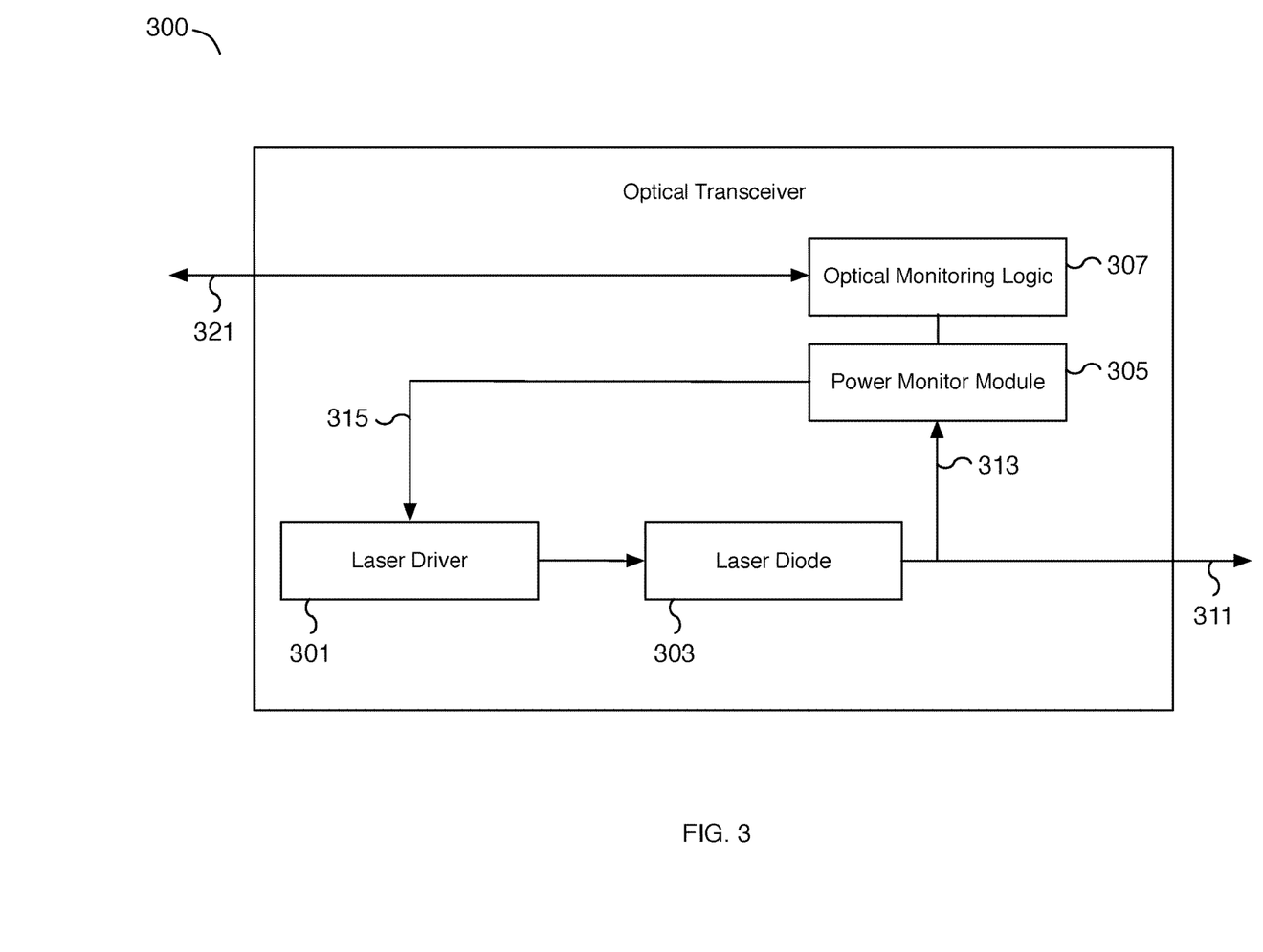
FIG. 3 is a functional diagram illustrating an embodiment of an optical network transceiver device.

FIG. 3 is a functional diagram illustrating an embodiment of an optical network transceiver device. In various embodiments, optical network transceiver device 300 is utilized to predict the failure of the device. In the example shown, optical network transceiver device 300 includes laser driver 301, laser diode 303, power monitor module 305, and optical monitoring logic 307. Laser driver 301 delivers an amount of current to laser diode 303 necessary to generate optical transmission output signal 311. In various embodiments, power monitor module 305 monitors the power output of optical network transceiver device 300. For example, power monitor module 305 monitors the magnitude of optical transmission output signal 311 via power monitor signal 313. In various embodiments, power monitor signal 311 is proportional to optical transmission output signal 311. In various embodiments, power monitor module 305 is implemented using a TAP monitor powering module. In some embodiments, the TAP monitor powering module is calibrated to increase the sensitivity of the monitoring.

In the example shown, power monitor module 305 sends loopback signal 315 to laser driver 301. Based on loopback signal 315, laser driver 301 will adjust the amount of current to feed laser diode 303. In various embodiments, loopback signal 315 is controlled by optical monitoring logic 307. In various embodiments, optical monitoring logic 307 is implemented using firmware (not shown) of optical network transceiver device 300. In some embodiments, optical monitoring logic 307 is implemented as a digital optical monitoring chip. For example, in some embodiments, optical monitoring logic 307 is implemented using an optical monitoring integrated circuit. In the example shown, communication channel 321 is utilized to communicate with optical monitor logic 307. For example, a full-rate inter-integrated circuit (I2C) communication protocol may be utilized to retrieve the power output of optical network transceiver device 300 via communication channel 321. In various embodiments, optical network transceiver device 300 includes an electrically erasable programmable read-only memory (EEPROM) (not shown) that may be accessed via communication channel 321. In some embodiments, the EEPROM is utilized to store information of optical network transceiver device 300 including data such as transmission power (e.g., power output), current, temperature, supplier, version, serial number, and/or vendor information.

In some embodiments, communication channel 321 is utilized to read data of optical network transceiver device 300, such as current and power output information. For example, current and power information is retrieved from optical network transceiver device 300 via communication channel 321 and provided to a network monitoring device, such as a network monitoring server running a monitoring dashboard. In various embodiments, the dashboard includes information of optical network transceiver device 300 including its operating parameters such as current, power output, temperature, serial number, version, vendor, etc.

In various embodiments, optical network transceiver device 300 attempts to maintain a constant or near-constant power output by monitoring optical transmission output signal 311 via power monitor signal 313. For example, in response to optical transmission output signal 311 dropping, optical monitoring logic 307 signals laser driver 315 to increase the amount of current using loopback signal 315. By increasing current, typically, the power output will also increase. In the event that the power output does not respond to an increase in current (e.g., optical transmission output signal 311 does not stabilize but instead continues to decrease), optical monitoring logic 307 may predict that optical network transceiver device 300 has a high likelihood of failing in the near term. For example, in the event the power output continues to drop, in some scenarios the device is likely to fail within the next 3 weeks. In some embodiments, the prediction of a near-term failure for optical network transceiver device 300 results in generating a maintenance ticket and/or troubleshooting task for the particular device and/or a request to replace the device.

In some embodiments, optical network transceiver device 300 attempts to maintain a power output within an operating range between beginning-of-life (BOL) and end-of-life (EOL) levels. For example, an operating range may be approximately 6 dB for the transmission power output with a BOL level of approximately 0 decibel-milliwatts (dBm) and an EOL level of approximately −6 dBm. In response to a power output drop (e.g., from 0 dBm to −3 dBm), power monitor module 305 identifies the change in power output and optical monitoring logic 307 directs laser driver 301 to increase the amount of current using loopback signal 315. In a correctly functioning optical network transceiver device, power output will stabilize. However, in the event the power output does not stabilize and continues to drop, the amount of current is increased until it approaches a saturation threshold. For example, in various embodiments, a saturation threshold is a current level of approximately 65 mA. In some embodiments, the saturation threshold is dependent on the vendor and/or model of optical network transceiver device 300. In the event the current is increased to a threshold, such as one approximating the saturation threshold, and power output continues to drop, optical monitoring logic 307 predicts the likelihood of optical network transceiver device 300 failing in the near-term is very high. In various embodiments, optical monitoring logic 307 predicts laser diode 303 has a high likelihood of failing within three weeks. In some embodiments, optical monitoring logic 307 and power monitoring module 305 monitor the slope or rate of change of optical transmission output signal 311 to predict the failure of laser diode 303. In some embodiments, a threshold is detected based on the saturation threshold and triggers the prediction of a high likelihood of a near-term failure of optical network transceiver device 300. For example, in some embodiments, a drop of 2 dBm is sufficient to trigger a failure warning for optical network transceiver device 300. In some embodiments, a drop of ⅓ of the range of the operating power output threshold is sufficient to trigger a failure warning for optical network transceiver device 300. For example, if the operating threshold is approximately 6 dB, then a drop of 2 dB is sufficient to trigger a failure warning for optical network transceiver device 300.

In some embodiments, in the event the amount of current reaches a saturation threshold but the power output is within operating specifications, optical monitoring logic 307 predicts the likelihood of optical network transceiver device 300 failing in the near-term (i.e., within several weeks) is low but that the likelihood of optical network transceiver device 300 failing in the long-term (i.e., in one year's timeframe) is high. For example, in the event the amount of current is increased to the saturation threshold and the power output stabilizes, optical monitoring logic 307 predicts the likelihood of optical network transceiver device 300 will fail in a year is high and likely has a remaining lifespan of approximately a year.

In various embodiments, optical network transceiver device 300 includes four laser diodes (not shown). In some embodiments, the four laser diodes each operate with a unique wavelength (e.g., 1271 nm, 1291 nm, 1311, and 1331 nm) with a gap between each wavelength (e.g., 20 nm). In some embodiments, a single laser driver is utilized to drive more than one laser diode. In various embodiments, in the event any one of the laser diodes fails, the entire optical link fails.

In various embodiments, optical network transceiver device 300 is optical network transceiver device 201 and/or optical network transceiver device 211 of FIG. 2. In various embodiments, optical transmission output signal 311 is an optical signal carried over an optical network connection such as optical network connection 113, 123, and/or 133 of FIG. 1 and/or optical network connection 250 of FIG. 2.

Figure 4:
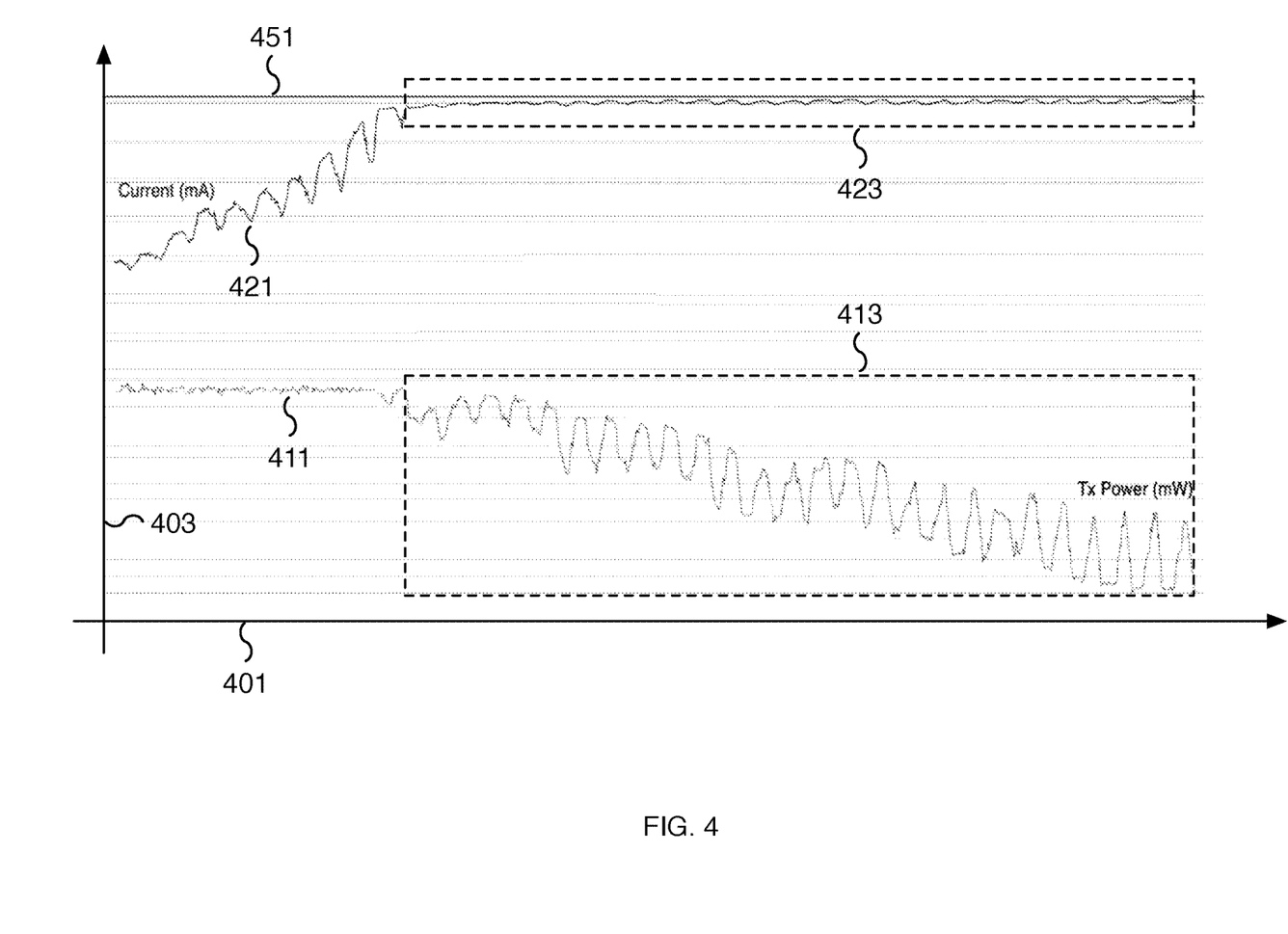
FIG. 4 is a graph illustrating an example of current and power output over time for an embodiment of an optical network transceiver device.

FIG. 4 is a graph illustrating an example of current and power output over time for an embodiment of an optical network transceiver device. The graph of FIG. 4 depicts transmission output power measurements 411 and current measurements 421 over time. X-axis 401 is a measurement of time and Y-axis 403 is a measurement of milliwatts (mW) for transmission output power measurements 411 and milliamps (mA) for current measurements 421. Maximum current level 451 represents a maximum operating current that can be all applied to a laser diode of an optical network transceiver device. For example, a current saturation threshold is based on maximum current level 451.

In various embodiments, the graph of FIG. 4 depicts the operation of an optical network transceiver device such as optical network transceiver device 300 of FIG. 3. In some embodiments, current measurements 421 are the amount of current used to drive a laser diode by a laser driver, such as laser diode 303 by laser driver 301 of FIG. 3, and transmission output power measurements 411 is a measurement of optical transmission output signal 311 by optical monitoring logic 307 and power monitor module 305 using power monitor signal 313 of FIG. 3.

In the graph of FIG. 4, current measurements 421 depict a trend of increasing the amount of current applied to the laser diode of the optical network transceiver device. Current region 423, corresponding to the region of current measurements 421 within the dotted rectangle, depicts the period of time where the current applied to optical network transceiver device is at a saturation threshold. For example, during the time represented by current region 423, the amount of current used by the laser diode of the optical network transceiver device is at a maximum operating level.

The graph of FIG. 4 also depicts a trend of minor fluctuations of transmission output power measurements 411 with a region having a stable power output followed by region with a trend of a steady drop in the power output. Power output region 413, corresponding to the region of transmission output power measurements 411 within the dotted rectangle, depicts the period of time where the current applied to optical network transceiver device is at a saturation threshold yet the power output does not stabilize and continues a trend of declining. For example, during the time represented by power output region 413, the amount of current used by the laser diode of the optical network transceiver device is at a maximum operating level but the value of the transmission output power continues to overall decline.

In various embodiments, a power monitor module is used to detect when an optical network transceiver device enters a condition represented in FIG. 4 by a declining power output region such as power output region 413 with a corresponding region such as current region 423 where the amount of current is at a threshold amount. In response to the detected conditions, an optical monitoring logic is used in predicting a high likelihood of a near-term failure of the optical network transceiver device. In some embodiments, the detection triggers an alarm and/or displays measurement information using a monitoring device such as a network monitoring station.

Figure 5:
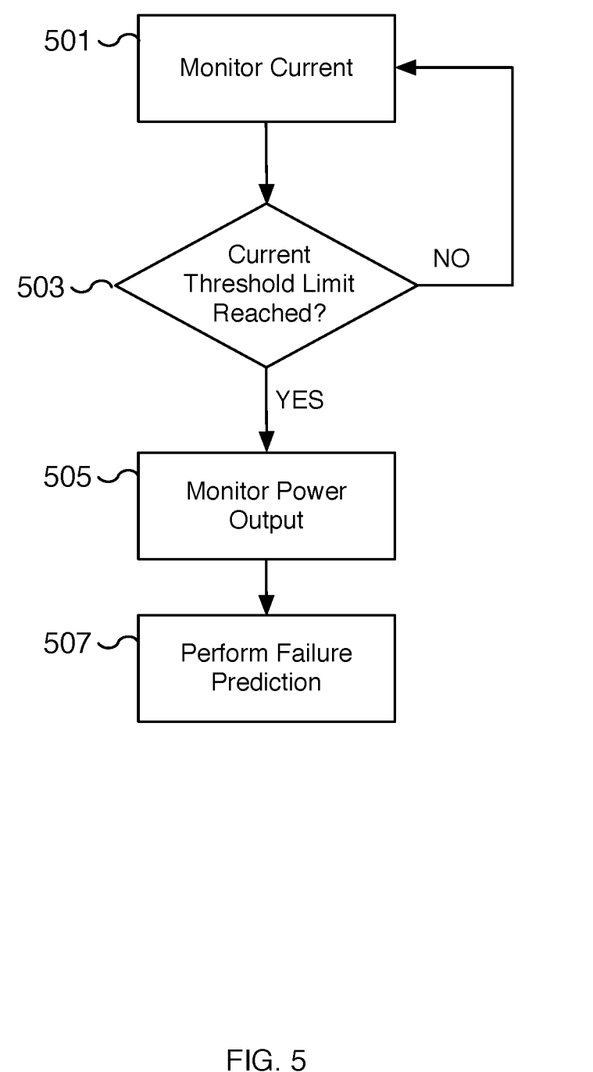
FIG. 5 is a flow diagram illustrating an embodiment of a process for predicting the failure of an optical network transceiver device.

FIG. 5 is a flow diagram illustrating an embodiment of a process for predicting the failure of an optical network transceiver device. The process of FIG. 5 may be utilized in a network environment to reduce the downtime of a network environment by preemptively replacing optical network transceiver devices that are predicted to fail in the near-term. In some embodiments, the process of FIG. 5 is performed using optical network transceiver device(s) in network environment 100 of FIG. 1, optical network transceiver devices 201 and 211 of FIG. 2, and optical network transceiver device 300 of FIG. 3. In some embodiments, the process of FIG. 5 is performed using a processor of a monitoring server to predict the failure of an optical network transceiver device.

At 501, the amount of current driving a laser diode of an optical network transceiver device is monitored. In some embodiments, a power monitor module controlled by optical monitoring logic is used to monitor the amount of current. In some embodiments, the power monitor module is power monitor module 305 of FIG. 3 and optical monitoring logic is optical monitoring logic 307 of FIG. 3. In some embodiments, the monitoring is performed using a digital optical monitoring chip on an optical network transceiver device. In some embodiments, the amount of current is monitored by monitoring a laser driver and/or the loopback signal received by a laser driver. In some embodiments, the laser driver is laser driver 301 of FIG. 3 and the loopback signal is loopback signal 315 of FIG. 3. In some embodiments, the current level is read from an electrically erasable programmable read-only memory (EEPROM) of the optical network transceiver device.

In various embodiments, at 501, the absolute level of the current is monitored and compared to a threshold level. For example, the amount of current is monitored and compared to a threshold level based on a maximum operating current level of an optical network transceiver device. In some embodiments, the maximum current level is based on the model of the optical network transceiver device and/or the vendor. In some embodiments, the maximum current level is depicted in FIG. 4 as maximum current level 451. In some embodiments, the maximum current level is a saturation current level. In various embodiments, the saturation current level is vendor and/or model specific.

At 503, a determination is made whether the monitored current has reached a threshold limit. As described above, in various embodiments, the threshold limit is based on the maximum operating current level of the optical network transceiver device. In some embodiments, the threshold limit is based on a current saturation level of an optical network transceiver device. In response to the current amount reaching the threshold, processing continues to 505. In response to not reaching the threshold, processing loops back to 501 to continue monitoring the amount of current.

At 505, the power output of the optical network transceiver device is monitored. In various embodiments, a power monitor module controlled by optical monitoring logic is used to monitor the transmitting power output. In some embodiments, the power monitor module is power monitor module 305 of FIG. 3 and optical monitoring logic is optical monitoring logic 307 of FIG. 3. In some embodiments, the monitoring is performed using a digital optical monitoring chip on an optical network transceiver device. In some embodiments, the monitoring is performed by tapping the optical transmission output signal of the device. For example, a power monitor signal such as power monitor signal 313 of FIG. 3 is utilized to monitor the output power of the optical network transceiver device.

In various embodiments, the slope and/or the rate of change of the power output is monitored. In some embodiments, the change in power output compared to an operating range is monitored. For example, the change in the transmission power output of an optical network transceiver device is monitored to detect drops that exceed ⅓ of the operating range for the power output. In some embodiments, the monitoring utilizes a power output threshold that is based on an end-of-life (EOL) measurement for the optical network transceiver device. In some embodiments, the monitoring of the power output includes determining a power output threshold based on a range calculated using a beginning-of-life (BOL) measurement and an end-of-life (EOL) measurement for the optical network transceiver device. For example, the power output is monitored for a drop exceeding a threshold based on a percentage of the range calculated using the difference between the BOL and EOL levels. In various embodiments, the monitoring of the power output includes reading a power output measurement from an electrically erasable programmable read-only memory (EEPROM) data corresponding to the optical network transceiver. For example, a full-rate inter-integrated circuit (I2C) communication protocol may be utilized to retrieve the power output of optical network transceiver device.

At 507, failure prediction is performed. In various embodiments, failure prediction is performed on the optical network transceiver device to predict the likelihood of the device failing. In some embodiments, the failure is the result of the laser diode failing. In various embodiments, the prediction is continuously performed based on the monitoring performed at 501 and 505. In some embodiments, the step of 507 is performed using a processor of a monitoring server by first retrieving the values monitored at 501 and 505 from the optical network transceiver device. In some embodiments, the values are retrieved using a full-rate inter-integrated circuit (I2C) communication protocol from electrically erasable programmable read-only memory (EEPROM) of the optical network transceiver device. In some embodiments, the step of 507 is performed using optical monitoring logic of the optical network transceiver device.

In various embodiments, the prediction performed at 507 predicts a likelihood of failure of the optical network transceiver device based on the current exceeding a threshold at 503 and the monitored power output at 505. In some embodiments, the prediction of a high likelihood of a near-term failure of the optical network transceiver device is triggered in the event of a drop greater than a power output decrease threshold. For example, a high likelihood of a near-term failure is predicted in the event the power output decreases beyond a threshold of 2 dBm. In some embodiments, the power output decrease threshold is based on a percentage of the intended operating range of the device. For example, in some embodiments a drop equal to or greater than ⅓ of the range of the operating power output is sufficient to trigger a failure warning for the optical network transceiver device. In some embodiments, the prediction is based on the rate of change and/or slope of the change of the power output. In various embodiments, the threshold may be dependent on the vendor and/or model of the optical network transceiver device.

In some embodiments, the prediction includes identifying a first stage with a likelihood of a long-term failure (i.e., predicted failure in approximately a year) and a second stage with a likelihood of a near-term failure (i.e., predicted failure within the next several weeks). In response to a prediction of a high likelihood of a long-term failure, the device can be monitored on a regular basis and replaced at a time nearing the expected long-term failure date and/or when the device triggers a near-term failure warning. In response to a prediction of a high likelihood of a short-term failure, the device can be monitored for expedited replacement and/or replaced immediately.

In various embodiments, the results of the prediction performed at 507 are regularly displayed on a monitoring device such as a network monitoring server. In some embodiments, the results are displayed on a dashboard. For example, a software dashboard provides a user interface for monitoring the status of the network environment and includes status information of one or more optical network transceiver devices. Alerts based on the prediction performed at 507 may be sent to and/or generated by the monitoring equipment. In some embodiments, an alert will trigger a ticket and/or maintenance request to inspect the optical network transceiver device associated with the alert.

Figure 6:
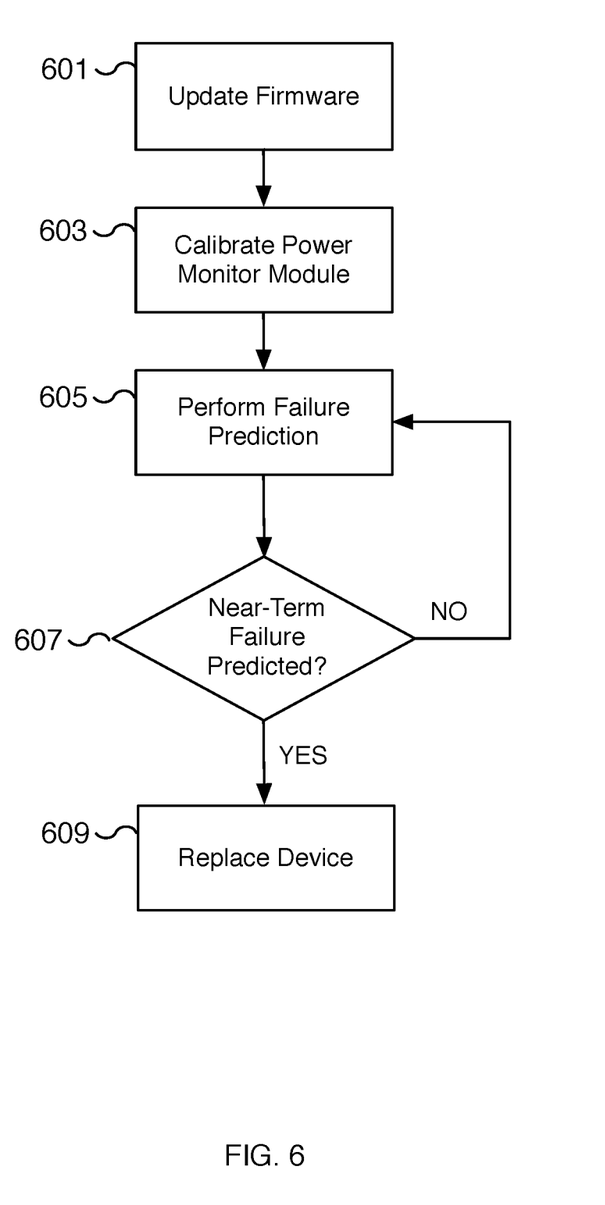
FIG. 6 is a flow diagram illustrating an embodiment of a process for updating an optical network transceiver device to include the capability for predicting failure.

FIG. 6 is a flow diagram illustrating an embodiment of a process for updating an optical network transceiver device to include the capability for predicting failure. In various embodiments, traditional optical network transceiver devices may include a power monitor module to dynamically adjust current to maintain a stable power output but lack the measurement sensitivity and the associated logic to implement the prediction processes described herein. The process of FIG. 6 can be applied to improve a traditional network environment to include the ability to predict the failure of optical network transceiver devices and to reduce the downtime associated with detecting link faults as a result of failed optical network transceiver devices. In some embodiments, the process of FIG. 6 may be applied to a network environment with components similar to the network environment of FIGS. 1 and/or 2.

At 601, the firmware of the optical network transceiver device is updated. For example, an optical network transceiver device is updated to utilized firmware configured to perform the functionality discussed herein, especially with respect to the process of FIG. 5. In various embodiments, the firmware updates the optical monitoring logic of an optical network transceiver device. In some embodiments, the firmware includes increasing the sensitivity for updating the feedback required to adjust the current of the device. For example, the firmware may adjust a loopback signal such as loopback signal 315 of FIG. 3 as soon as the power output monitored reduces by 5 percent. In some embodiments, the firmware updates include the logic to detect the amount of current reaching a threshold limit, the maximum current of a device, and/or the change in the power output of the device. In some embodiments, the logic includes the saturation current level of the device, which may be vendor or model specific. In various embodiments, the logic gathers the data described above and predicts the likelihood of failure as described in FIG. 5. In some embodiments, the firmware is updated using a bi-directional communication protocol to communicate with the optical network transceiver device. In some embodiments, the optical monitoring logic is optical monitoring logic 307 of FIG. 3.

At 603, the power monitor module of the optical network transceiver device is calibrated. For example, the power monitor module is calibrated to increase the sensitivity of the device to its operating properties, such as power output and power output feedback sensitivity. For example, the power monitor module is calibrated to detect changes in power output of 5% of more. In some embodiments, the power monitor module is calibrated to detect 5% changes in power output. In some embodiments, the power monitor module is calibrated to detect changes in power output of less than 5%. In various embodiments, the power monitor module is calibrated to detect changes based on a programmable parameter. By increasing the sensitivity of the power monitor module, the loopback signal used to modify the current of the laser diode can respond more quickly to changes in power output. Moreover, increased sensitivity allows the monitoring logic to more quickly and accurately predict the likelihood of failure. In various embodiments, a power monitor module that is not calibrated as described herein lacks the sensitivity to predict the likelihood of failure of an optical network transceiver device. In various embodiments, the power monitor module is power monitor module 305 of FIG. 3.

At 605, failure prediction is performed. For example, the optical monitoring logic of the optical network transceiver device performs a prediction process using the monitored parameters and a current threshold. In some embodiments, the failure prediction process is described in FIG. 5. In various embodiments, the prediction process includes identifying a high likelihood of a near-term failure of a laser diode. In some embodiments, prediction process also includes identifying a high likelihood of a long-term failure of a laser diode. In some embodiments, the prediction is accompanied with an appropriate alert identifying the optical network transceiver device and the prediction result. For example, an alert is generated by a network monitoring device, such as a monitoring server. In some embodiments, the alert identifies the optical network transceiver device using a device identifier and/or location and includes the prediction that the device has a high likelihood of failing in the near term.

At 607, a prediction is made that the optical network transceiver device has a high likelihood of experiencing a near-term failure. In the event a high likelihood of a near-term failure is predicted, processing continues to 609. In some embodiments, a predicted high likelihood of a near-term failure indicated the device is likely to fail in the next several weeks and the associated network infrastructure will likely incur significant downtime if the optical network transceiver device is allowed to fail as predicted. In the event a high likelihood of a near-term failure is not predicted, processing loops back to the 605 and prediction is continuous performed based on the monitored operating conditions.

At 609, an optical network transceiver device is replaced. For example, the optical network transceiver device is not allowed to fail as predicted and instead is preemptively removed from the network and replaced. In some embodiments, the replacement is prompted by an alert from a monitoring device, such as a network dashboard. By preemptively removing the device, significant downtime is avoided. In some embodiments, the device is first marked for inspection and then removed pending the inspection and/or troubleshooting results. In various embodiments, performing a preemptive inspection and/or troubleshooting routine on an optical network transceiver device requires significant less work than identifying a faulty optical network transceiver device once a network link has failed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   calibrating a monitoring sensitivity of a power monitor that monitors a power output of an optical network transceiver device;
   monitoring an amount of current provided to a laser diode of the optical network transceiver device;
   detecting that the amount of current has reached a threshold limit;
   monitoring the power output of the optical network transceiver device using the power monitor, including by determining a range based on a difference between a beginning-of-life transceiver power output level and an end-of-life transceiver power output level, determining a threshold magnitude that is a relative portion of the determined range, and detecting whether the power output drops by a magnitude that is greater than the threshold magnitude associated with the determined range; and
   based at least in part on the detection that the amount of current has reached the threshold limit and the monitored power output of the optical network transceiver device, providing an indication associated with a likelihood of failure of the optical network transceiver device.

2. The method of claim 1, further comprising triggering an alert in response to the indication associated with the likelihood of failure of the optical network transceiver device.

3. The method of claim 2, wherein the alert identifies the optical network transceiver device.

4. The method of claim 3, wherein the alert is displayed at a monitoring device.

5. The method of claim 4, wherein the monitoring device is a network dashboard.

6. The method of claim 1, wherein the monitoring of the power output includes determining a slope corresponding to a change in the power output.

7. The method of claim 1, wherein the monitoring of the power output includes identifying a change of less than 2 decibel-milliwatts associated with the power output.

8. The method of claim 1, wherein the relative portion of the determined range is a relative percentage or fraction of the determined range.

9. The method of claim 1, wherein the determined range is an operating range of the optical network transceiver device.

10. The method of claim 1, wherein the threshold limit is based on a vendor specification for the optical network transceiver device.

11. The method of claim 1, wherein the threshold limit is a saturation value for the optical network transceiver device.

12. The method of claim 1, wherein providing the indication includes predicting the likelihood of failure of the optical network transceiver device.

13. The method of claim 1, wherein the monitoring of the power output includes reading a power output measurement from an electrically erasable programmable read-only memory (EEPROM) data corresponding to the optical network transceiver device.

14. The method of claim 1, wherein the monitoring of the power output includes utilizing a full-rate inter-integrated circuit (I2C) communication protocol for retrieving the power output from an electrically erasable programmable read-only memory (EEPROM) of the optical network transceiver device.

15. The method of claim 1, wherein the providing the indication associated with the likelihood of failure of the optical network transceiver device includes identifying a first stage with a likelihood of a long-term failure and a second stage with a likelihood of a near-term failure.

16. The method of claim 1, wherein monitoring the amount of current includes transmitting the amount of current to a monitoring server.

17. The method of claim 16, wherein monitoring the power output includes transmitting the power output to the monitoring server.

18. A system, comprising:
a processor; and
a memory coupled with the processor, wherein the memory is configured to provide the processor with instructions which when executed cause the processor to:
   calibrate a monitoring sensitivity of a power monitor that monitors a power output of an optical network transceiver device;
   monitor an amount of current provided to a laser diode of the optical network transceiver device;
   detect that the amount of current has reached a threshold limit;
   monitor the power output of the optical network transceiver device using the power monitor wherein monitoring the power output includes determining a range based on a difference between a beginning-of-life transceiver power output level and an end-of-life transceiver power output level, determining a threshold magnitude that is a relative portion of the determined range, and detecting whether the power output drops by a magnitude that is greater than the threshold magnitude associated with the determined range; and
   provide an indication associated with a likelihood of failure of the optical network transceiver device based at least in part on the detection that the amount of current has reached the threshold limit and the monitored power output of the optical network transceiver device.

19. The system of claim 18, wherein the threshold limit is based on a current saturation value.

20. A method, comprising:
updating a firmware of an optical network transceiver device wherein the firmware is configured to:
   monitor an amount of current provided to a laser diode of the optical network transceiver device;
   detect that the amount of current has reached a threshold limit;
   monitor a power output using a power monitoring hardware of optical network transceiver device, wherein the firmware is configured to monitor the power output including by being configured to determine a range based on a difference between a beginning-of-life level and an end-of-life level, determine a threshold magnitude that is a relative portion of the determined range, and detect whether the power output drops by a magnitude that is greater than the threshold magnitude associated with the determined range; and
   predict a likelihood of failure based at least in part on the detection that the amount of current has reached the threshold limit and the monitored power output; and
calibrating the power monitoring hardware to increase a monitoring sensitivity for monitoring the amount of current provided to the laser diode.

* * * * *